INVENTOR
LLEWELLYN B. GRIFFITH
BY Henry H. Snelling
ATTORNEY

United States Patent Office 2,822,329
Patented Feb. 4, 1958

2,822,329

AQUATIC POND

Llewellyn B. Griffith, Arlington, Va.

Application August 30, 1955, Serial No. 531,321

11 Claims. (Cl. 210—14)

This invention relates to the treatment in an aquatic pond of the effluent from a sewage plant and has for its principal object the providing of a final high degree of purification at low cost before discharge from the pond to the river or other flowing stream.

Another object of the invention lies in the provision of means to preserve a stocked aquatic pond against the effects of sudden overload from a sewage plant.

A further object of the invention is to preserve the balance of nature in an aquatic pond by providing a haven for marine life of various kinds in which the oxygen content of the water is kept at or near the saturation point.

A still further object of the invention is to avoid the long, laborious task of reseeding an aquatic pond after severe depletion of the oxygen content in any manner as, for example, by overloading the pond during a brief period of excess operation of the sewage plant.

It is the purpose of the aquatic pond of the present invention to lower the cost of a high degree of purification by operating the sewage plant so that it will reduce by 80% the biochemical oxygen demand and that the pond itself will complete the treatment so that the discharged liquid from the pond will have a treatment value of 95% or better. As is well known, the cost of a reduction of 90% in a sewage plant is about twice as great as of 80% and the cost again is doubled as we raise the treatment value so that 95% of the objectionable matter is removed.

By providing an aquatic pond properly stocked with fish, snails, worms, turtles, polliwogs, bacteria, microorganisms and other marine life, as well as with algae, lily pods and other vegetation, the cost of continuing the treatment from 80% to 95% is very slight once the pond is in operation. A pond of this type, however, can be ruined in a very few hours by an overload from the sewage plant and it is proposed to avoid the long delay in reseeding by providing a haven wherein a nucleus of marine life will always be present due to the constant provision of oxygen saturated water. In this haven I keep alive some of the bacteria which propagate readily on plates provided that sufficient oxygen is present and preferably proximate this, I provide a haven for other living creatures where the oxygen supply is always ample and where the small fish can readily swim where they will be free from danger from the larger turtles.

Figure 1:
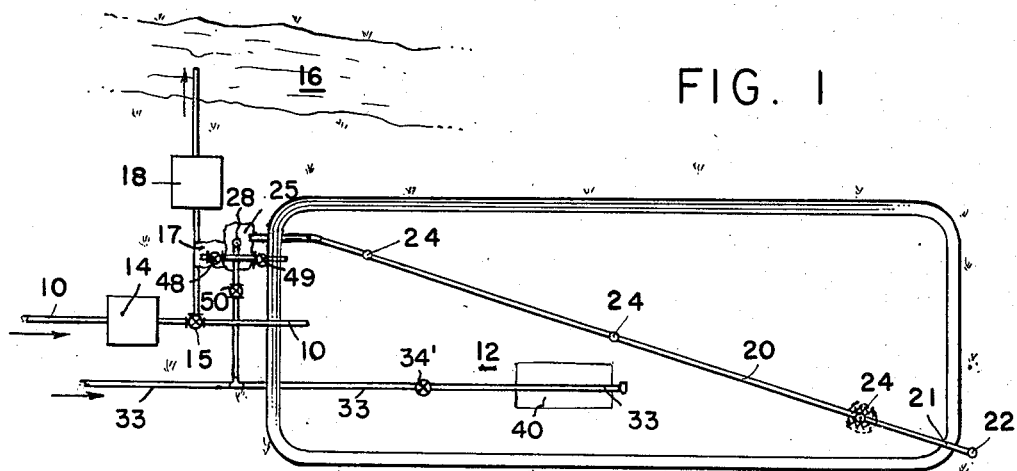
Figure 1 is a plan view.
Figure 2:
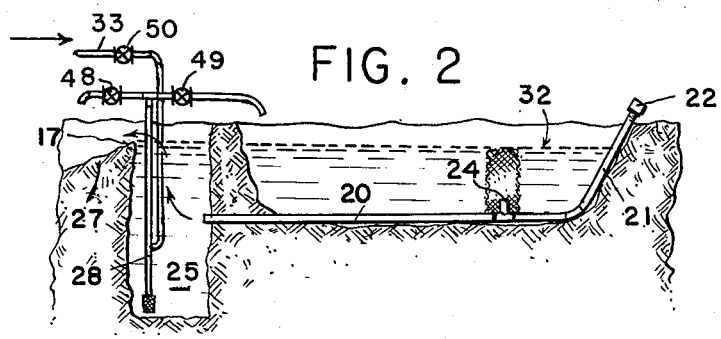
Figure 2 is a vertical section.

The effluent pipe 10 leads from a sewage treating plant from which the effluent, while usually passing to the pond 12 through a flowmeter 14, may be sent by valve 15 directly to the stream 16. Fluid material delivered to the pond 12 when treated is discharged at point 17 and preferably passes through a chlorinator 18. The discharge from the pond is through a diagonally laid pipe 20 extending to a sloping bank of the pond and there rising as at 21 providing a clear-out portion of the pipe which may have at its free end a plug 22 which can be removed for insertion of the end of a hose pipe for cleaning out the pipe 20 whenever that becomes necessary. The entry nipple 24 may be in any desired location and preferably there are a number of such nipples, all but one being capped in general practice. Water passes through the pipe 20 to a sump 25 (Figure 2) and rises to the water level 32 in the pond which is governed by the discharge at 17 over a weir 27. An air lift 28 may be used to drain the pond when required.

Figure 3:
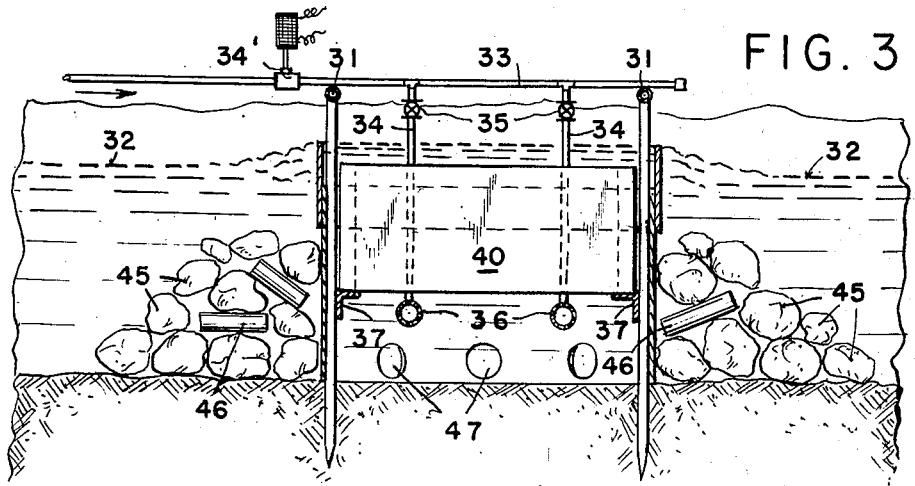
Figure 3 is a central vertical section on a larger scale of the recirculation and reseeding haven.

Somewhere in the pond, not necessarily in the center, I provide an oxygenating haven so that at all times a nucleus for the reseeding of the pond may be preserved. A simple form of the haven is shown in Figure 3 wherein four rods or pipes 30 are driven in the bed of the pond and connected in pairs by transverse horizontal rods or pipes 31 appreciably above the water level 32 of the pond. On these supports 31 I rest a main air pipe 33, the flow through which is governed by a solenoid controlled valve 34. The air may therefore be supplied to the pipe 33 constantly in very small quantities or intermittently at reasonably frequent intervals. The main air pipe 33 feeds a plurality of downwardly directed pipes 34 each controlled by a hand valve 35 to preserve uniformity of flow through the two pipes 34 each of which leads to a porous diffuser tube 36 of usual form.

On angles 37 fast to each pair of pipes 30 are sheets of transite material forming bacteria plates 40 as in a sewage plant. The plates could be 3' x 4' with the usual battens to hold them firmly with a space of four inches between centers. These plates will be seeded with the desired bacteria (aerobic slimes) and these organisms will be kept alive by the constant flow of air upward to them from the diffuser tube 36. The four pipes 30 are surrounded by a sheet metal casing 41 which extends nearly to the water surface 32 but carries at its top a sleeve 43 which enables the casing top to be elevated above the water level to any desired degree and to form a weir all around the casing 41 so that the water elevated by the air from the tubes 36 may spill evenly over on all four sides. All around the casing I supply large rocks 45 forming a sort of cairn in which are imbedded a number of hideaways 46, for example, 4" concrete drain pipes, this size being excellent for protecting the smaller fish from the large snapping turtles. Still smaller trout, bass or other fish can readily swim in the crevices between the rocks 45 which may be from 6" to a foot or more in diameter. Such fish require an oxygen content of 5 parts per million so I discharge the air at a rate to give at least this figure in the cairn and approximately 8 p. p. m. under usual conditions in the pond.

The pond is compact, preferably only 10 to 20 square feet of surface per person served and about 100 feet on a side to insure recirculation of the water in all areas of the pond and to give the equivalent of at least five miles of stream purification and in about the same manner. The biochemically treated effluent to the pond has in it animal life which, with the algae, etc. of the pond, furnishes the food for the various forms of marine life in turn. By supplying much more oxygen than the minimum to preserve life in the bacteria there is sufficient for the fish, etc., consequently there is in the haven at all times a nucleus with which to restock the pond in case of unexpected dearth of oxygen outside of the haven.

In operation the treated effluent from the biological sewage plant flows to the pond through pipe 10. Air valve 50 being closed, air is delivered through pipe 33 to the diffuser pipes 36 in the haven at a rate to keep an oxygen content of about 8 parts per million. At chosen intervals the solenoid-controlled valve 34' operates to deliver the full pressure of air to these diffuser pipes. This causes the water level to rise within the casing 41 so as to spill in all directions over the adjustable sleeve weir 43 and consequently the entire pond is increased in oxygen content. Should it be desired to empty the pond, valve 50 is opened, thus putting the air lift 28 in action. Closing the valve 49 and opening valve 48 discharges the water over the weir 17 to the stream 16, while with valve 48 closed and 49 opened, the pond water is recirculated independently of the discharge of air to the haven.

What I claim is:

1. The method of treating the effluent of a biological sewage plant which has reduced the biological oxygen demand by 80%, to further purify it, which consists in flowing the treated effluent to a stocked aquatic pond and circulating the water of the pond, whereby to reduce the original biological oxygen demand by 95%.

2. The method of claim 1 in which air is discharged into a small portion of the pond to elevate the surface of said portion and thus add to the oxygen content of the pond.

3. The method of claim 2 in which the water passing to the edge of the pond is directed downwardly and toward the bottom of the pond proximate the raised portion of the surface.

4. The method of claim 3 in which the air is discharged near the bottom of the pond roughly centrally of the pond.

5. The method of preserving a nucleus of animal and vegetable life in an aquatic pond into which treated effluent from a sewage plant is discharged, where occasional overloads may be expected from the plant, which consists in forming in the pond and in contact with the water thereof a haven for such life and in maintaining in such haven a supply of oxygen sufficient to preserve life within the haven without regard to the quantity of available oxygen in the pond outside of said haven.

6. The method of claim 5 in which the water within the haven is in free communication with the water of the pond beneath the haven and at the top of the haven water may pass from the haven to the pond but not vice versa.

7. The method of claim 6 in which a stream of air is bubbled near the open bottom of the haven to draw pond water upwardly into the haven and to discharge water over the top of the haven to the surface of the pond outside of the haven.

8. A haven for use in an aquatic pond having means for holding the water in the pond at a chosen water level comprising a casing closed on four sides, a plurality of spaced means for supporting bacteria within the casing, means for discharging air beneath the spaced means, and an adjustable weir controlling the height of the water within the casing.

9. The haven of claim 8 with a cairn surrounding the casing, the water in the pond being in communication with the water within the casing at the bottom thereof, the adjustable weir being at a higher level than the water level in the pond, whereby to prevent pond water from flowing into the casing over the weir.

10. In an aquatic pond a sump, means for discharging pond water by gravity from the pond to the sump, a weir controlling the water level in the pond, an air lift in the sump, and valved piping discharging water from the air lift selectively to a point within the pond or a point beyond the weir.

11. The haven of claim 8 in which the casing is surrounded by a cairn and a plurality of drain pipes within the cairn to provide for protection of smaller fish.

References Cited in the file of this patent

UNITED STATES PATENTS

| 880,783 | Erlwein et al. | Mar. 3, 1908 |
| 1,055,082 | Rogers | Mar. 4, 1913 |
| 1,509,979 | Pryor | Sept. 30, 1924 |
| 1,513,882 | Bateman | Nov. 4, 1924 |
| 1,574,783 | Beth | Mar. 2, 1926 |
| 1,800,378 | Everson | Apr. 14, 1931 |
| 1,811,181 | Maltby | June 23, 1931 |
| 1,991,896 | Hays | Feb. 19, 1935 |
| 2,283,472 | Tuxhorn | May 19, 1942 |
| 2,293,051 | Duffy | Aug. 18, 1942 |
| 2,653,907 | Griffith | Sept. 29, 1953 |
| 2,674,574 | Pettas | Apr. 6, 1954 |
| 2,730,496 | Zavod | Jan. 10, 1956 |

OTHER REFERENCES

Sewerage and Sewage Treatment, sixth edition, by Harold E. Babbitt, published by John Wiley and Sons, Inc., New York. Page 347 is cited.